(12) United States Patent
Van Kol

(10) Patent No.: US 11,745,240 B2
(45) Date of Patent: Sep. 5, 2023

(54) DOUBLE WALLED TUBE SEGMENT AND METHOD FOR PRODUCING SAID TUBE SEGMENT

(71) Applicant: TATA STEEL NEDERLAND TECHNOLOGY B.V., Velsen-Noord (NL)

(72) Inventor: Tessa Virginia Van Kol, Voorschoten (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 4 days.

(21) Appl. No.: 17/596,472

(22) PCT Filed: Jun. 11, 2020

(86) PCT No.: PCT/EP2020/066209
§ 371 (c)(1),
(2) Date: Dec. 10, 2021

(87) PCT Pub. No.: WO2020/249677
PCT Pub. Date: Dec. 17, 2020

(65) Prior Publication Data
US 2022/0266323 A1      Aug. 25, 2022

(30) Foreign Application Priority Data

Jun. 13, 2019   (EP) .................................... 19180111

(51) Int. Cl.
*F16L 9/14*        (2006.01)
*B21C 37/15*       (2006.01)
(Continued)

(52) U.S. Cl.
CPC .......... *B21C 37/154* (2013.01); *B23K 31/027* (2013.01); *F16L 9/18* (2013.01); *F16L 9/22* (2013.01); *B23K 2101/06* (2018.08)

(58) Field of Classification Search
CPC ..................................... F16L 9/18; F16L 9/22
(Continued)

(56) References Cited

U.S. PATENT DOCUMENTS 236,077 A * 12/1880 Peirce ................. F24F 13/0209
                                                       138/148
802,210 A * 10/1905 Heise ..................... E21D 11/15
                                                       405/133

(Continued)

FOREIGN PATENT DOCUMENTS

GB       2548098 A       9/2017
WO    2011089314 A1       7/2011

OTHER PUBLICATIONS

International Search Report and Written Opinion dated Sep. 23, 2020 for PCT/EP2020/066209 to Tata Steel Nederland Technology B.V. filed Jun. 11, 2020.

*Primary Examiner* — James F Hook
(74) *Attorney, Agent, or Firm* — Vorys, Sater, Seymour and Pease LLP

(57) ABSTRACT

A double-walled tube section for constructing a double-walled tube segment suitable for underpressure applications such as an evacuated tube transport system including elongated curved outer shell parts, interlayer shell parts and an inner wall. The elongated curved outer shell parts form the outer wall of the double-walled tube segment. The interlayer shell parts are of thin sheet and include a rectangular portion having short edges and long edges and a flange on at least one of the short edges.

17 Claims, 10 Drawing Sheets

(51) Int. Cl.
  *B23K 31/02* (2006.01)
  *F16L 9/22* (2006.01)
  *F16L 9/18* (2006.01)
  *B23K 101/06* (2006.01)

(58) Field of Classification Search
  USPC .................... 138/148, 155, 158; 405/151
  See application file for complete search history.

(56) References Cited

U.S. PATENT DOCUMENTS

| | | | | |
|---|---|---|---|---|
| 889,350 | A * | 6/1908 | Anderson | 494/67 |
| 1,020,942 | A | 3/1912 | Bachelet | |
| 1,326,617 | A * | 12/1919 | Stenwick | F16L 9/18 52/89 |
| 1,677,714 | A * | 7/1928 | Frease | E04C 3/32 74/552 |
| 1,838,242 | A * | 12/1931 | Wilson | F16L 59/07 160/DIG. 7 |
| 2,077,137 | A * | 4/1937 | Wilkoff | E21D 11/15 405/151 |
| 2,114,834 | A * | 4/1938 | Foukal | E21D 11/15 405/153 |
| 3,053,283 | A * | 9/1962 | Allen | F16L 9/18 165/154 |
| 4,429,654 | A | 2/1984 | Smith, Sr. | |
| 4,674,542 | A | 6/1987 | Baillet | |
| 5,295,764 | A * | 3/1994 | Cunat | E21D 11/15 52/800.1 |
| 5,950,543 | A | 9/1999 | Oster | |
| 7,740,731 | B2 * | 6/2010 | Leontaridis | B29C 66/8414 156/303.1 |
| 2018/0282006 | A1 | 10/2018 | Grip et al. | |
| 2021/0291880 | A1 * | 9/2021 | Wyman | E21D 11/20 |

* cited by examiner a.

b.

DOUBLE WALLED TUBE SEGMENT AND METHOD FOR PRODUCING SAID TUBE SEGMENT

CROSS-REFERENCE TO RELATED APPLICATIONS

This is a § 371 National Stage Application of International Application No. PCT/EP2020/066209 filed on Jun. 11, 2020, claiming the priority of European Patent Application No. 19180111.7 filed on Jun. 13, 2019.

FIELD OF THE INVENTION

This invention relates to a double-walled tube segment and a method for producing such a double-walled tube segment.

BACKGROUND OF THE INVENTION

A hyperloop is a proposed mode of an evacuated tube transport system (ETT) for passenger and/or freight transportation, first used to describe an open-source vactrain design released by a joint team from Tesla and SpaceX. Drawing heavily from Robert Goddard's vactrain, a hyperloop comprises a sealed vacuum tube or system of vacuum tubes through which a pod may travel free of air resistance or friction conveying people or objects at high speed and acceleration. Elon Musk's version of the concept, first publicly mentioned in 2012, incorporates reduced-pressure tubes in which pressurized capsules ride on air bearings driven by linear induction motors and air compressors. The tubes would run above ground on pylons or below ground in tunnels. The concept would allow travel which is considerably faster than current rail or air travel. An ideal hyperloop system will be more energy-efficient, quiet, and autonomous than existing modes of mass transit.

Developments in high-speed rail have historically been impeded by the difficulties in managing friction and air resistance, both of which become substantial when vehicles approach high speeds. The vactrain concept theoretically eliminates these obstacles by employing magnetically levitating trains in evacuated (airless) or partly evacuated tubes, allowing for very high speeds. The principle of magnetic levitation is disclosed in U.S. Pat. No. 1,020,942. However, the high cost of magnetic levitation and the difficulty of maintaining a vacuum over large distances has prevented this type of system from ever being built. The Hyperloop resembles a vactrain system but operates at approximately one millibar (100 Pa) of pressure and can therefore be described as an evacuated tube transport (ETT) system as disclosed in general terms in U.S. Pat. No. 5,950,543.

An ETT system solves many problems associated with classic transport by moving all obstacles from the path of travel. The object traveling (in this case a capsule) is in a tube so it stays on the intended path and no obstacles can get on the path. If subsequent capsules undergo identical acceleration and deceleration, many capsules can travel the same direction in the tube at once with complete safety. Acceleration and deceleration are planned to prevent the capsule from becoming an obstacle to subsequent capsules. The reliability of the capsules is very high due to minimal or no reliance on moving parts. Most of the energy required to accelerate is recovered during deceleration.

One of the important elements of an ETT-system is the tube. These tubes require a large internal diameter for allowing the pods containing the freight or passengers to pass through. The atmospheric pressure in the tube is about 100 Pa, so it must be able to withstand the pressure from the surrounding atmosphere of about 101 kPa. As the tubes above ground would often be supported (e.g. by pylons) the tube must also be able to span the gap between two supports without bending or buckling. According to the full proposal of the Hyperloop Alpha project a tube wall thickness between 20 to 23 mm is necessary to provide sufficient strength for the load cases considered such as pressure differential, bending and buckling between pylons, positioned about 30 m apart, loading due to the capsule weight and acceleration, as well as seismic considerations for a passenger tube. For a passenger plus vehicle tube the tube wall thickness for the larger tube would be between 23 to 25 mm. These calculations are based on a tube having an internal diameter of 3.30 m. However, calculations have also shown that the economics of the ETT-system can be much improved by increasing the pod size travelling through the tube. These increased pod sizes require an internal diameter in the order of 3.50 to 5.00 meter. If these diameters of tube are produced from steel plate or strip, then this requires a thickness in the order of 30 mm. No hot strip mill is currently able to supply material of this thickness, and therefore these tubes would have to be produced from plate. With the proposed wide spread use of the ETT system and steel as the preferred material for the tube, this would require approx. 3000 ton/km×20000 km=60 Mton. Currently the total production of plate in EU28 is about 10 Mton/year. Apart from this capacity problem, producing tubes from plate requires an enormous amount of cumbersome handling and shaping on-site and welding of the plate, as well as that the tubes become very heavy. A 5 m diameter tube of 30 mm thick steel weighs 3700 kg/m, meaning that segments of 10 m weigh 37 tonnes. The payload of a Mi-26 helicopter is about 22 tonnes. Transport via the road is impractical in view of viaducts or other restrictions.

Buckling refers to the loss of stability of a structure and in its simplest form, is independent of the material strength where it is assumed that this loss of stability occurs within the elastic range of the material. Slender or thin-walled structures under compressive loading are susceptible to buckling. So, the tube must not only be able to withstand the pressure difference and be able to span 30 m without significant sagging, it must also have sufficient buckling resistance. Using higher strength steels may increase the mechanical properties, and thereby lead to some material saving by allowing a thinner wall thickness, but not the buckling resistance.

Objectives of the Invention

It is the object of the invention to provide a tube segment for a tube for underpressure applications that is lighter than a conventionally produced spiral-welded tube, and which is not susceptible to buckling.

It is a further object of the invention to provide a tube segment for a tube for underpressure applications that can be produced on-site.

It is a further object of the invention to provide a tube segment for a tube for underpressure applications that can be produced with a reduced amount of welding.

It is a further object of the invention to provide a tube segment for a tube for an ETT-system the components of which can be transported by road.

It is a further object of the invention to provide a tube segment for an ETT-system which uses less material than a single skin tube while providing similar buckling performance with acceptable stiffness and which is conventionally manufacturable from hot- or cold-rolled strip steel.

BRIEF DESCRIPTION OF THE DRAWINGS

FIG. 10a shows the flat central portion abuts the flange of the adjacent interlayer shell part.

FIG. 10b shows the flat central portion 4a lies under the flange 4d of the adjacent interlayer shell part.

DESCRIPTION OF THE INVENTION

Figure 1:
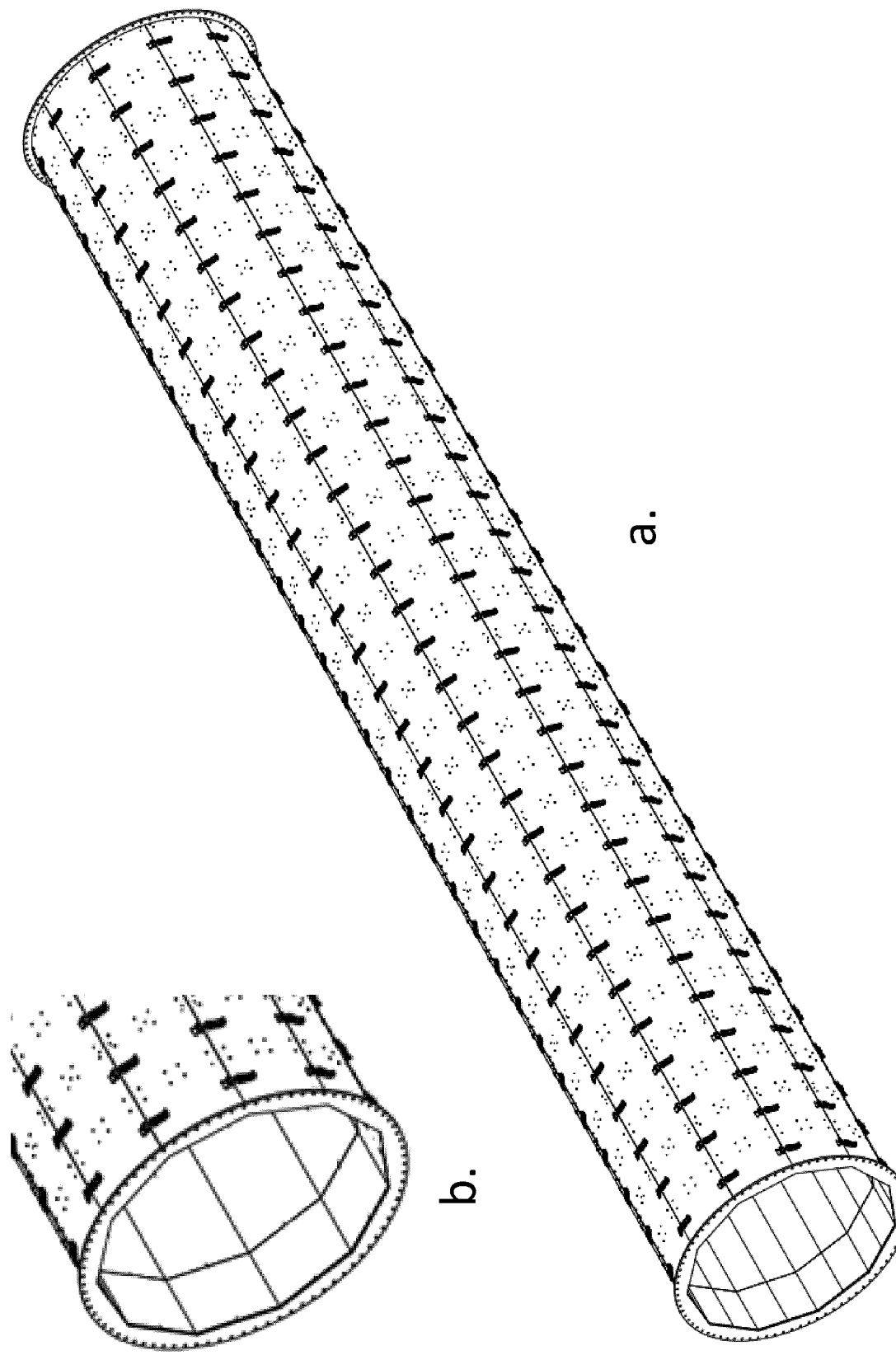
FIG. 1 shows a double-walled tube segment according to the invention.

One or more of these objects is reached with a double-walled tube section (dwts) suitable for underpressure applications or near vacuum applications comprising elongated curved outer shell parts (3), interlayer shell parts (4) and an inner wall (IW), wherein
 the elongated curved outer shell parts (3) form the outer wall (OW) of the double-walled tube segment and consist of thin sheet, wherein the elongated curved outer shell part comprises a curved central portion (3a) and a flange (3d) along one of the long edges (3b, 3c) wherein the flange (3d) is folded towards the interior of the double-walled tube segment and wherein the centre of the radius of curvature R of the elongated curved outer shell parts lies inside the double-walled tube segment;
 wherein the interlayer shell parts (4) consist of thin sheet and comprise a rectangular portion (4a) having short edges (4b, 4c) and long edges (4f, 4g) and a flange (4d) on at least one of the short edges (4b, 4c), wherein the flange is folded towards the exterior of the double-walled tube segment, wherein the flange has a curved upper edge (4e) with the same radius of curvature as the radius of curvature of the curved central portion (3a) of the elongated curved outer shell parts (3), and wherein the curved edge (4e) is provided with an additional flange (4h) with the same radius of curvature as the radius of curvature of the curved central portion (3a) of the elongated curved outer shell parts (3);
 wherein the inner wall (IW) of the dwts is a regular N-facetted polygonal tube consisting of thin sheet;
 wherein the rectangular portions (4a) of the interlayer shell parts are fixedly connected to the facets of the outside of the IW;
 wherein the inner surface of the curved central portion (3a) of the elongated curved outer shell parts (3) are joined to the interlayer shell parts (4) at least at the additional flange (4h) of the interlayer shell part (4) to form the outer wall (OW).

If the underpressure application or near vacuum application is an evacuated tube transport system tube, then the internal atmosphere in the tube is, in use, near vacuum.

In the context of this invention wherein the pressure outside the tube is the atmospheric pressure of about 101 kPa (1 bar), near vacuum means that the pressure inside the tube is less than 10 kPa (≈0.1 bar), preferably less than 1 kPa (≈0.01 bar or 10 mbar), even more preferably less than 500 Pa (≈5 mbar) or even 200 Pa (≈2 mbar), or even about 100 Pa (≈1 mbar).

Preferably the circumferentially abutting curved central portions of elongated curved outer shell parts are fixedly joined together along the long edges.

The dwts according to the invention is a concept which can produce small and large diameter tubes. This design uses less material than the equivalent single gauge walled tube whilst achieving the same external pressure buckling performance with acceptable vertical stiffness between supporting pylons and has other benefits, particularly the absence of (excessive amounts of) welding during construction. Preferably the incircle of the tube segment, and thus the tube produced with the tube segments, is at least 2 m, more preferably at least 3 m, even more preferably at least 4 m or even 5 m.

The dwts is manufactured with a double wall configuration. In the context of this invention a double walled tube means that at least two walls are discernible in the design with a space between the two. The space between the two walls can be empty or filled (with e.g. a foam).

The elongated curved outer shell part (eosp) in combination with the interlayer shell parts and inner wall provides the airtightness to maintain the very low pressures inside the tube. The interlayer shell parts and the inner wall provide support to the outer skin to help resist global buckling.

The airtightness can be further improved by covering the seams between the interlayer shell parts and/or the seams between the parts making up the IW with an airtight foil or tape. Alternatively, an airtight foil, an airtight shrink wrapping, or an airtight adhesive tape can be provided between the IW and the interlayer shell parts to produce an airtight layer between the IW and the interlayer shell parts.

A single walled tube segment without any reinforcements against buckling needs to be constructed from thick flat material, e.g. spiral-welded steel strip. For a 4 m diameter tube the thickness of the strip of E420 HSLA steel is already 15 mm for a safety factor of 1. A safety factor of 2 increases the thickness to 20 mm. This thickness is in the upper range of the hot-strip mills capability. Also, a 15 mm tube segment of 30 m in length and of 4 m in diameter already weighs 45 tonnes.

A 4.5 m diameter spiral-welded steel tube would require a thickness of about 23.3 mm and weigh 77 tonnes. The tube according to the invention weighs about 25 tonnes, for the same internal diameter, i.e. about a third of a spiral-welded single wall tube of the same diameter and length, and so a large weight reduction is achieved by the tube segment according to the invention. The combination of an eosp, interlayer shell parts and inner wall with the ribs and stringers provided by the flanges of the eosp and the interlayer shell parts result in a high buckling resistance but with a much lower weight. Compared to the flat spiral welded strip the same buckling strength can be obtained with the double walled tube segments according to the invention wherein the tube segment according to the invention would be about 3 times as light as the equivalent tube segment from flat spiral welded strip.

Preferably the angle between the flat central portion (4a) and the folded edge portion (4d) is between 75 and 1050, more preferably 85 and 950, most preferably 90° (orthogonal). The additional flange is a curved flange matching the curvature of the curved central portion of the eosp. The additional flange has to be formed at the already curved edge and has a marked advantage in that the additional flange forms a plane which can support the elongated curved outer shell parts and onto which the curved central portion of the elongated curved outer shell part can subsequently be attached with relative ease. Preferably the angle between the flange (4d) having the curved edge (4e) and the additional flange (4h) is between 85 and 950, preferably 90° and/or wherein the curvature of the upper surface of the additional flange is congruent with the curvature of the elongated curved outer shell part (3).

In an embodiment the curved central portion (3a) of the elongated curved outer shell part is connected to the flange of the curved edge (4e), or to the additional flange at the curved edge (4h), of the interlayer shell part (4) by releasable connecting means, and wherein the elongated curved outer shell part is connected to the inner wall (IW) or the flat portion (4a) of the interlayer shell part (4) by releasable connecting means.

The composing parts can be produced by straightforward roll forming and bending processes from hot-rolled or cold-rolled steel strip. The segments can be produced on site by assembling the composing parts and subsequently assembled into a longer tube.

The inwardly folded flanges 3d on the eosp run along the length of the tube segment and these are known as stringers (or longitudinal ribs). The flanges 4d of the interlayer shell parts 4 are folded outward (as viewed from in the final tube segment) and the flanges 4d of adjacent interlayer shell parts are aligned to form part of an annulus known as a rib or annular rib. The ribs and stringers form the skeleton of the tube segment (see figure #). The elongated curved outer shell part has a length L, and a width w. Preferably L>5w, more preferably L>10w and even more preferable L>15 w. Preferably the eosp's extend along the entire length of the dwts, so that there are no abutting short edges between two eosp in a dwts. The curvature of the elongated curved outer shell part is in the width direction, because the curvature will be part of the circumference of the tube. Assuming for example that 10 eosp's will form a cylindrical tube, then each eosp covers 360/10=36° of the circumference of the tube. The elongated curved outer shell part is preferably straight in the length direction. Turns in an ETT-track can be easily managed on the basis of straight dwts's.

With the assistance of the interlayer shell part and inner wall the external pressure can be effectively resisted. The performance increase of the lighter gauges is predominantly achieved by the additional out of plane stiffness of the external skin. The buckling can manifest itself in multiple ways with global modes seeing the collapse of the whole tube and local modes showing failure between the stiffening rib and stringer structures. This twin wall structure in combination with the ribs act to resist the global buckling modes.

A tube for an underpressure application is divided into double walled tube segments of a manageable size. The tube segment is fixedly connected to other tube segments to form the tube. The connection between the tube segments must be airtight so as to allow a low pressure to exist in the tube. This airtightness may be provided by the connection itself, i.e. as a result of welding, or by some compound between the tube segments, such as an elastomer e.g. in the form of an O-ring, when the tube segments are bolted or clamped together, or by means of an expansion joint to deal with thermal expansion of the tube segments.

The length of a double walled tube segment is not fixed. Typically, the length is between 10 and 50 m. The Hyperloop concept study assumes length of 30 m to be feasible. Such a length can be transported through air, train or on a lorry. For ETT applications the diameter of the inscribed circle in the tube segment is preferably least 3 m. A suitable upper boundary for this diameter is 5 m, although this is not a limitation per se. If the tube segment is strong and stiff enough, diameters of larger than 5 m are conceivable without deviating from the gist of the invention as claimed. Also, the tube is not necessarily circular in cross section. The tube may also be oval, or any other suitable shape. The advantage of a circular tube is that the double walled tube segments can be substantially identical so that a degree of standardisation is reached.

In an embodiment the flat portion of the interlayer shell part is provided with reinforcements against buckling. These reinforcements an have the form of one or more longitudinal dimples 6 parallel to the edges 4d. The IW may also be provided with dimples, but these reduce the internal diameter of the tube, and are thus possible but not preferable.

The curved central portion of the eosp can optionally also be provided with intruding or protruding reinforcements (aka imprints or dimples) against buckling to further improve the buckling resistance.

In a first embodiment the reinforcement against buckling are intruding or protruding reinforcements in the surface of the eosp. Intruding means that the dimples locally reduce the internal diameter of the tube segment and are therefore referred to as inwardly oriented dimples. Protruding means that the dimples locally increase reduce the internal diameter of the tube segment and are therefore referred to as outwardly oriented dimples. The dimples in the curved portion of the eosp are preferably intruding reinforcements. The deformation of the tube by the dimples and the shape of the dimpled surface increase the resistance against buckling compared to the undimpled curved portion. The shape of the dimples is not particularly restrictive, but it is advantageous to provide the dimples in a regular pattern, such as a hexagonal or golf ball pattern. This regularity provides the strip with a predictable behaviour, and the dimples can be applied by means of a technology like roll forming or pressing. The depth of the dimples can be tailored to the specific case.

The interlayer shell parts are folded such that the flange 4d forms the basis for the annular ribs. The flange is shaped such that its upper edge matches the curvature of the curved surface of the eosp. This means the height $h_c$ at the centre of the flange is larger than the height $h_e$ at the edge.

Figure 8:
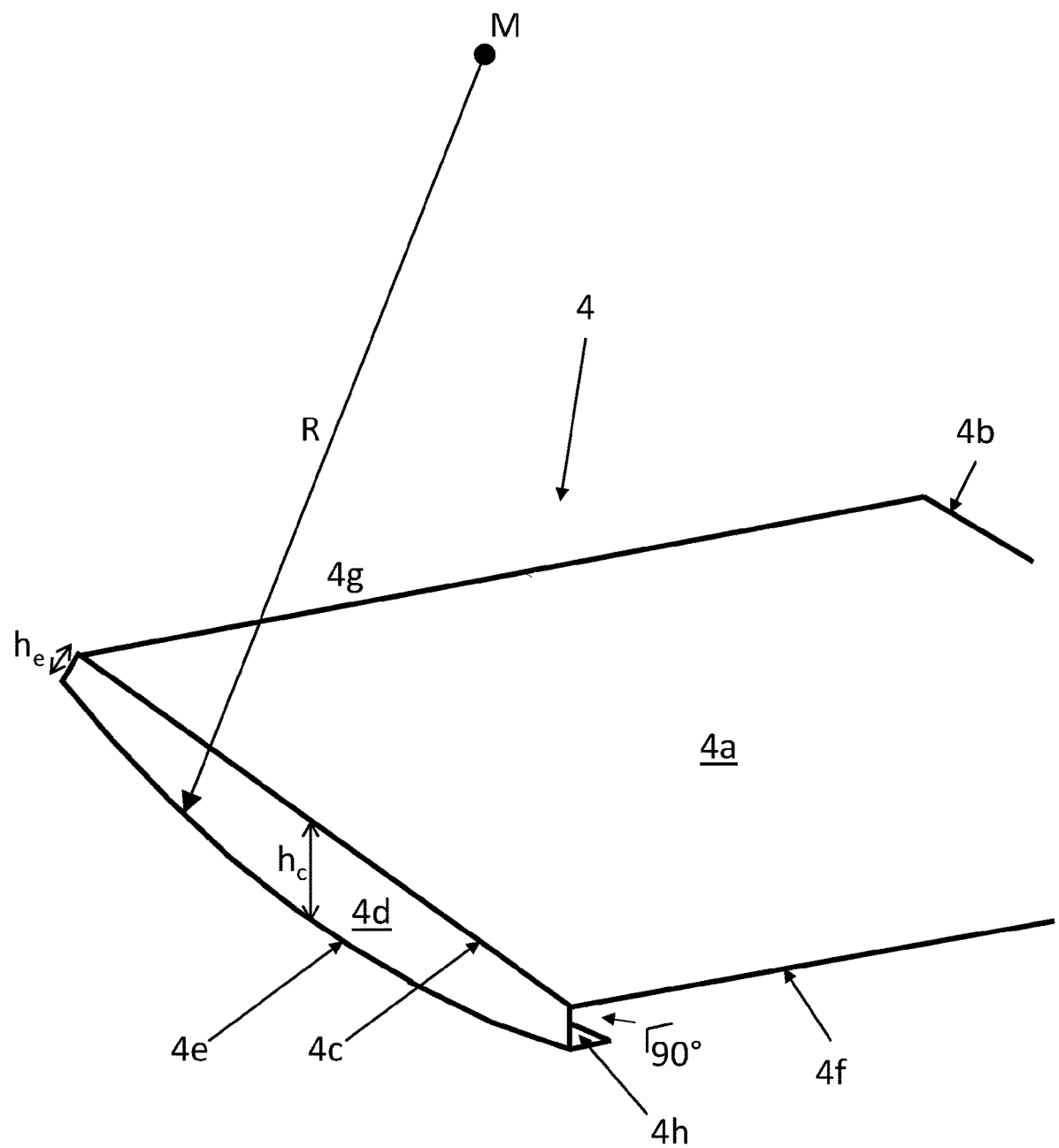
FIG. 8 shows a schematical drawing of the interlayer shell part.

The inner shell parts (faceted rings or individual inner shell parts) and the interlayer shell parts are suitable for high volume production. All three basic composing parts have very high levels of material utilisation. In the example of FIG. 8 $h_e$=70 mm, which is about the same as the height of the flange 3d of the eosp, and $h_c$ is 160 mm. The values are not limiting values and can be chosen differently depending on the amount of eosp's making up the tube segment and depending on the requirements imposed on the tube segment, which again depend on the specific application. It is however well within the scope of the skilled person to determine the optimum values for any specific application.

The minimum number of eosp's is limited by the rolled steel strip width and the height of the flange 3d. More segments result in narrower eosp's and in additional stringers which may contribute to tube vertical stiffness. The cell size between ribs and stringers will have an influence on the local buckling modes, along with any skin stiffening from imprints. The global mode is likely to be influenced by the stringer height, and the rib spacing. If it were deemed worthwhile, 2 or more different length interlayer shell parts could be made. Longer ones located at the ends of the tube, short enough to limit local buckling modes and shorter ones to provide more ribs and hence more global mode support in the middle portion of the tube. If so desired, then the interlayer shell parts could be rotated 180° for instance at about half length of the dwts so that the flange 4d is on the other side. This may require interlayer shell parts that have a shortened flat section 4a to prevent the annular ribs being distanced too far away in the middle of the dwts.

Alternatively, the interlayer shell parts may be provided with a flange 4d with the additional flange 4h on both short edges of the interlayer shell parts. Using interlayer shell parts with those curved flanges on both sides provides wider annular ribs and more surface to attach the curved portion of the eosp to.

It is important that the inner shell parts are positioned staggeredly in relation to the interlayer shell parts so that the seams between the inner shell parts and the seams between the interlayer shell parts do not overlap to prevent leakage and subsequent loss of the near vacuum conditions.

In an embodiment the edge (4b) overlaps the edge (4c) of the longitudinally adjoining interlayer shell part. This can be done by providing edge 4c with a step having about the same height as the thickness of the adjoining interlayer shell part so that the edge 4b of the adjoining interlayer shell part can be positioned snugly under the edge provided with the flange 4d (see FIG. 10).

The tube in the example has 11 eosp's, which as a prime number means that for global modes there is no repeat divisible pattern mode shape possible. So a 2, 3 or 4 lobe radial pattern would flex different parts of the segments and would not be able to exploit any weak section.

In an embodiment the rectangular portions of one, more or all of the inner shell parts and/or the interlayer shell parts is provided with protruding or intruding reinforcements (6) against buckling.

In an embodiment circumferentially adjacent elongated curved outer shell parts are connected by releasable connecting means. After the elongated curved outer shell parts have been connected to the edges or the additional flanges on the edges of the interlayer shell parts, the outer shell parts still must be connected to each other to form a rigid tube.

In this embodiment releasable connecting means are used. An example of a suitable releasable connecting means is a toggle clamp.

In an alternative embodiment adjacent elongated curved outer shell parts are connected together by welding along the long edges (3f, 3g) of the curved central portions. Although this amounts to a considerable weld length, the weld provides a rigid and sturdy connection all along the abutting long edges of adjacent elongated curved outer shell parts. If the eosp's are joined together by welding a process such as laser welding, laser hybrid welding, gas metal arc welding is preferred along the entire length. Welding the eosp's together further improves the airtightness of the tube segment connection.

The space between the eosp and the interlayer shell part can be filled with a structural foam.

In an embodiment tube for an evacuated tube transport system (ETT) is provided comprising a plurality of double-walled tube segment according to the invention.

According to a second aspect, the invention is also embodied in a method for constructing a double-walled tube segment (1) suitable for underpressure applications or near vacuum applications wherein the double-walled tube segment comprises elongated curved outer shell parts (3), interlayer shell parts (4) and an inner wall (IW) which is a regular N-facetted polygonal tube, wherein the method comprises the following steps:

Providing an internal support jig for temporarily supporting and holding the inner wall (IW);

Optionally
  providing an airtight foil, an airtight shrink wrapping or an airtight adhesive tape around the outer perimeter of the inner wall temporarily held by the support jig to form a polygonal outer surface of the tube segment or;
  covering the seams between the interlayer shell parts and/or the seams between the parts making up the IW with an airtight foil or tape;

Joining a plurality of interlayer shell parts (4) onto the facets of the polygonal outer surface of the tube segment to cover the facets of the polygonal outer surface of the tube whereby the flanges (4d) of all interlayer shell parts (4) are circumferentially aligned so as to form complete annular ribs around the internal wall of the tube segment;

Forming the outer surface of the tube segment by joining the curved central portion (3a) of the elongated curved outer shell parts (3) to the additional flanges (4h) of the interlayer shell parts;

Removing the internal support jig

The elongated curved outer shell parts (3), interlayer shell parts (4) are as described herein above. The IW consists of a plurality of N-facetted polygonal tube rings consisting of thin sheet or of a plurality of inner wall parts suitable to form the N-facetted polygonal tube rings;

The provision of the airtight foil or shrink wrapping may be performed by spiral wrapping. The airtight foil may be for instance 3M's Flexible Air Sealing Tape FAST UC 8045, which is a 1 mm thick one-sided adhesive tape.

The inner shell parts (5) (N-faceted rings or individual inner shell parts) in the dwts according to the invention that collectively form the inner wall are not necessarily fixed to each other. Consequently, in order to produce the inner wall of the dwts the inner shell parts have to be kept in place by means of an internal support jig. External support jigs are not suitable because it would be in the way of the subsequent assembly of the dwts. The support jig may be provided with (electro)-magnets or suckers to hold the inner shell parts in place temporarily. It is important that the inner shell parts are as close together as possible to make the dwts as airtight as possible. Once all, or at least a sufficient number, of the inner shell parts are held in place by the jig, the optional foil, wrapping or tape can be applied. Since the inner shell parts are provided with longitudinal kinks the inner shell parts form facets of the polygonal inner wall of the dwts. The entire width of each facet is subsequently completely covered by the flat portion (4a) of the interlayer shell part (4)

thereby effectively covering the abutments of the edges of the adjoining inner shell parts. This means that the abutting inner shell parts must be flush in that they together form a flat surface to receive the interlayer shell part, both in the circumferential direction and in the longitudinal direction. In other words: the angle between the two neighbouring inner shell parts (5) at the abutment is 180°. If the abutting inner shell parts do not form a flat surface, then the interlayer shell part will not snugly fit onto the abutting inner shell parts and the resulting gap will result in a failure to produce an airtight connection, even when using an airtight foil, wrapping or tape. If the abutting inner shell parts do form a flat surface, then as soon as the inner shell parts are fixed to the interlayer shell parts then this connection is already airtight. By using the airtight foil, wrapping or tape this is further improved.

The interlayer shell parts are positioned such that their upstanding flanges 4*d* are aligned and form annular ribs around the circumference of the tube. Lastly, the eosp's are attached to the flanges (4*h*) on the upstanding edges (4*d*) and to each other. The connection of the eosp's along their long edges may be done with releasable fixing means or by welding.

The steel strip used to produce the three basic components may be as-hot-rolled, optionally galvanized and/or organically coated, steel or cold-rolled, optionally annealed and optionally galvanized and/or organically coated. The as-rolled or as-coated steel strip is usually provided in the form of a coiled steel strip. With a mobile production facility for producing the eosp's and isp's directly from coiled strip these can be produced on site.

In order to provide the interlayer shell part with the flange 4*d* with the curved edge and to provide the curved edge 4*e* with the additional flange a combination of bending and drawing may be appropriate. The flange 4*d* can be made by simply bending the flange, but the curved edge and the flange thereon cannot be produced by simple bending as this would lead to a wrinkled additional flange 4*h*.

The tube segment according to the invention is intended for constructing an evacuated tube transport system. However, the specific properties of the tube segment, and its ability to perform under conditions wherein the pressure exerted on it from outside the tube produced from these tube segments is significantly higher than the pressure in the tube, may make it also suitable for the application of tubes operating under similar pressure conditions. Examples of these applications are underground or underwater tunnels for traffic such as bicycle tunnels, car tunnels, train tunnels, maintenance tunnels or shafts, tubes in hydro-electric power stations, gas storage systems in which underpressure occurs or may occur, etc.

The tube may serve as a platform for mounting photo-voltaic devices such as solar panels.

In an embodiment the inner wall and the inter layer shell parts are connected by means of threaded studs (8) fixedly provided on the inner wall (IW), joints (9) provided with threading on both sides to connect with the threaded studs (8) of the IW on one side and threaded bolts (10) on the other side, wherein the interlayer shell parts (4) are provided with holes corresponding with the locations of the studs (8), wherein the studs (8) penetrate the optional airtight foil, shrink wrapping or adhesive tape (7) during its application, and wherein the joints (9) are threaded onto the studs (8) and firmly join the IW to the interlayer shell parts (4), optionally with the foil, wrapping or tape (7) in between, wherein the joints (9) also serve as distance holders between the interlayer shell parts (4) and the elongated curved outer shell parts (3), and wherein the elongated curved outer shell parts (3) are also provided with holes corresponding with the location of the joints (9) and wherein the elongated curved outer shell parts (3) are connected to the joints (9) by the threaded bolts (10).

In an embodiment the curved portion (3*a*) of the elongated curved outer shell part (3) is connected to the additional flange (4*h*) by means of internally threaded three-piece rivets. These rivets are also known as "jo-bolts".

The joints are preferably flexible joints so that they can absorb thermic expansion and also absorb differences in orientation between the direction of the stud on the IW and the direction of the curved central portion of the eosp.

DESCRIPTION OF THE DRAWINGS

The invention will now be further explained by means of the following, non-limitative drawings.

FIG. 1 shows a double-walled tube segment according to the invention. The tube segment shows dwts comprising 11 eosp's connected to each other using locking clamps. These locking clamps would not be needed if the eosp's were connected to each other by welding, which is also embodied by this invention. In the dwts the N-faceted (N=11 in this example) regular polygonal are visible. The interlayer shell parts are not visible in this figure. The ends of the dwts are provided with a flange than may be bolted to the upstanding flanges 4*d* of the interlayer shell parts which are flush with the ends of the dwts or welded to the dwts. The flange may e.g. serve as a connector to another dwts or to an expansion joint. In FIG. 1*a* the IW is produced by abutting N inner wall parts 5 per ring (as shown in FIG. 7*c*), and in FIG. 1*b* the IW is produced from IW rings (as shown in FIG. 7*d*)

Figure 2A:
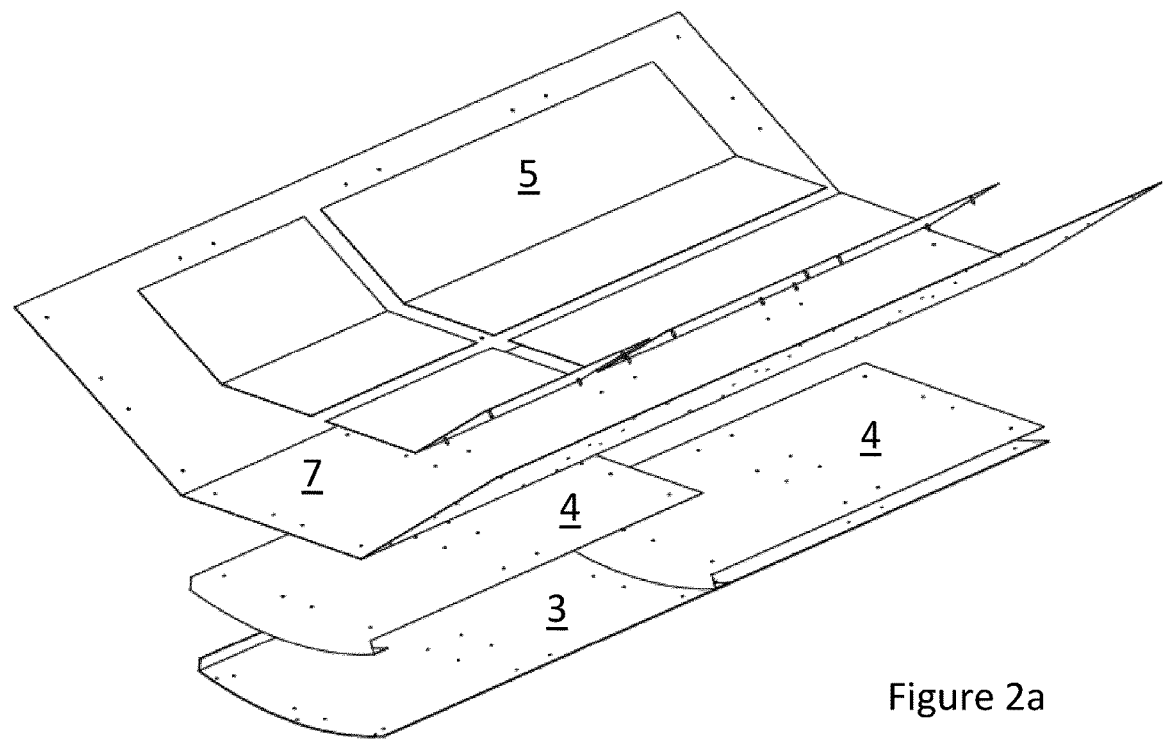
FIG. 2a shows the schematic build-up of the dwts.

FIG. 2*a* shows the schematic build-up of the dwts. Parts of four inner individual shell parts (5) making up the inner wall (IW) are shown on top and the foil 7 is shown as well. The seam between the four inner shell parts is exaggerated and these four inner shell parts are as close together as possible. The width of the two adjacent flat portions 5*a* of two adjacent inner shell parts is the same as the width of the interlayer shell part 4 and the eosp is slightly wider because it must cover the curved edge of the interlayer shell part and abut the neighbouring eosp. There may be no gap between two adjacent eosp's in the final dwts. It is clear from this drawing that if the IW is an N-faceted regular polygonal that circumferentially N interlayer shell parts and N eosp's are required to fully cover the circumference of the dwts. This applies generally to all dwts's produced according to the invention.

Figure 2B:
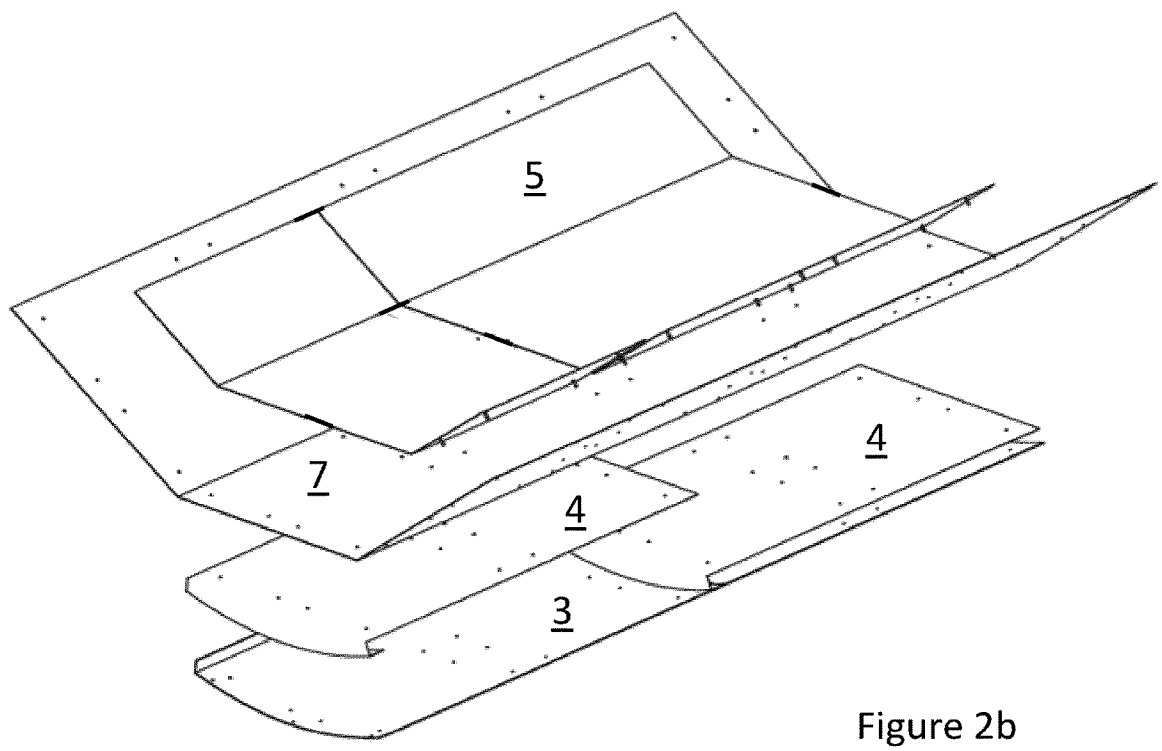
FIG. 2b shows the same as FIG. 2a, only with the inner shell parts being provided in the form of N-faceted rings (of which a part is shown).

FIG. 2*b* shows the same as FIG. 2*a*, only with the inner shell parts being provided in the form of N-faceted rings (of which a part is shown).

Figure 3A:
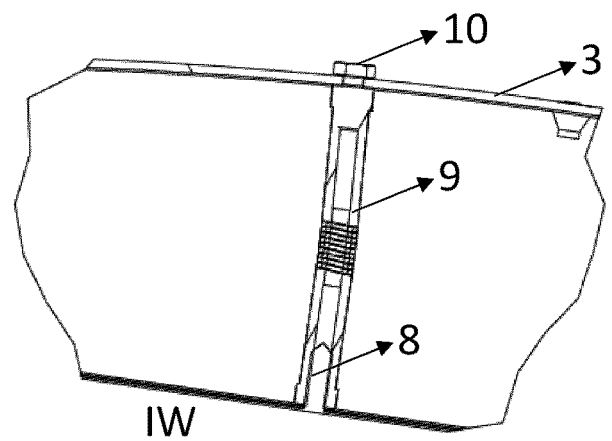
FIGS. 3a and 3b show two examples of using joints that have a certain flexibility wherein differences in height or orientation can be accommodated with the stud, the joint and the bolt.
Figure 3B:
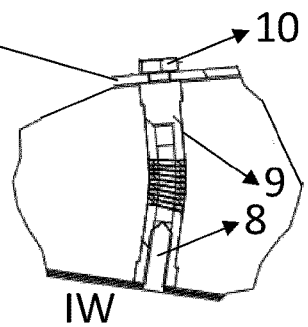
Figure 3C:
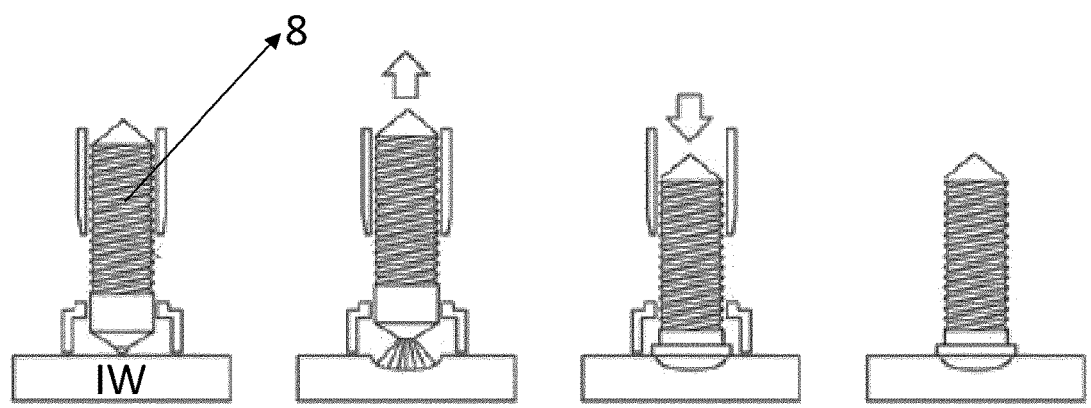
FIG. 3c shows the different stages in attaching a stud to the outside surface of the inner wall.

Irrespective of whether there is an airtight foil, wrapping or tape between the inner wall IW and the interlayer shell parts 4, in the dwts according to the invention the inner wall IW and the interlayer shell parts 4 are connected to each other to form a rigid connection which is airtight. The connection can be made by welding threaded studs onto the outside surface (see FIG. 4) of the inner wall IW at well-defined positions and provide holes at equally well-defined and corresponding positions in the flat portion 4*a* of the interlayer shell part. The studs may be provided with a sharp point to puncture the foil, wrapping or tape when it is being applied. The thread on the studs allows fixing the inner wall IW to the interlayer shell parts 4 by means of a nut or, preferably, a tubular joint which also serves as a distance holder, which is also provided with internal threading on both sides to connect with the threaded studs of the inner wall on one side and a threaded bolt on the other side. By placing the interlayer shell panel over the studs welded onto the inner shell parts and fastening the joint onto the stud the interlayer and inner shell part are fixedly connected, with the optional foil, wrapping or tape in between. The welded studs have the advantage that the inner wall is not penetrated by bolt-holes, which they would have to be if a normal bolt would be used. This would lead to an increased risk of leakage and loss of vacuum. It is noted that the joint also serve as distance holders and allow fastening the eosp to by leading a bolt through the eosp into the internal thread of the joint. By using joints that have a certain flexibility differences in height or orientation can be accommodated. FIGS. 3a and 3b show two examples thereof with the stud (8), the joint (9) and the bolt (10). FIG. 3c shows the different stages in attaching a stud to the outside surface of the inner wall.

For connecting the eosp to the additional flange of the interlayer shell part a so-called jo-bolt can be used. It is blind structural fastener that is used on difficult riveting jobs when access to one side of the work is impossible. It consists of three parts—a threaded steel alloy bolt, a threaded steel nut, and an expandable stainless-steel sleeve. The parts are factory preassembled. As the Jo-bolt is installed, the bolt is turned while the nut is held. This causes the sleeve to expand over the end of the nut, forming the blind head and clamping against the work. Caps serve as distance holders between the elongated curved outer shell part and the interlayer shell part and threaded bolts through holes in the elongated curved outer shell parts and the additional flanges (4h) to the threaded blind rivet fix the elongated curved outer shell part to the additional flange.

Figure 4:
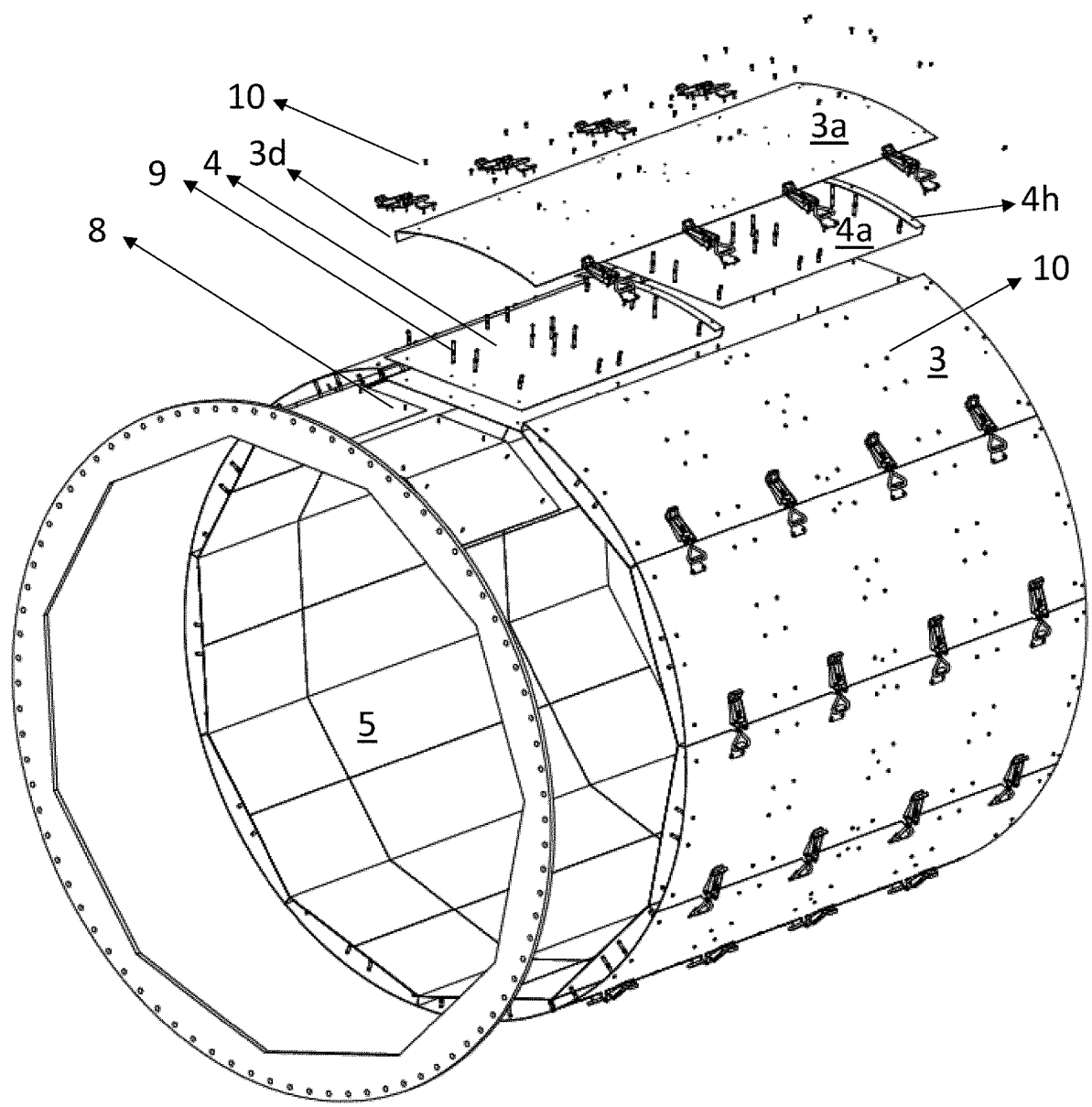
FIG. 4 shows an exploded view of the dwts according to the invention.

FIG. 4 shows an exploded view of the dwts according to the invention. The N-faceted inner wall (IW) is clearly visible as well as the interlayer shell parts (4) and the elongated curved outer shell parts (5). The studs are visible on the outside of surface of the inner wall (IW) and the joints are clearly visible on top of the interlayer shell parts, ready to engage with the studs on the inner wall. The space between the outer wall formed by the eosp's and the interlayer shell parts is left empty in this example, as apparent because the joints can still be seen in this space. An example of a coupling flange is also shown.

The outside of the tube segment is formed by a plurality of eosp's that have a curvature to form a smooth and cylindrical surface. The cross section in FIG. 1 is circular, and this is also the preferable shape.

It is conceivable that the cross section may be non-circular, e.g. oval or N-faceted, but in the case of an oval cross section the curvature of the eosp is not the same for each one making up the circumference of the tube segment, and this is not preferable from a process efficiency point of view. However, it may be applicable e.g. to house switches. The N-faceted OW is simpler to construct as it does not require the eosp to have a curved central portion but instead has a flat central portion, which also does not require the edge 4e to be curved, which in turn makes interlayer panel 4 easier to form. However, in this the distance between the IW and the OW is constant, and this results in a lower apparent diameter of the tube, and thus in a lower buckling resistance as compared to the curved eosp.

The number of eosp's sections needed to produce a tube segment depends on the width of the available metal sheet and the desired diameter of the tube segment. It is preferable to produce the eosp from coiled steel sheet. In that case the width of the eosp is determined by the width of the coil. Assuming a width of 1.50 m and 4 mm thick steel strip and a 6 cm high flange a tube segment with an external diameter of 5 m requires 11 eosp's. A 4 m diameter tube segment requires 9 eosp's.

The curved central portions of the eosp's in FIG. 4 are coupled in this example by locking clamps. The alternative would be welding the curved central portions of the eosp's together.

Figure 5:
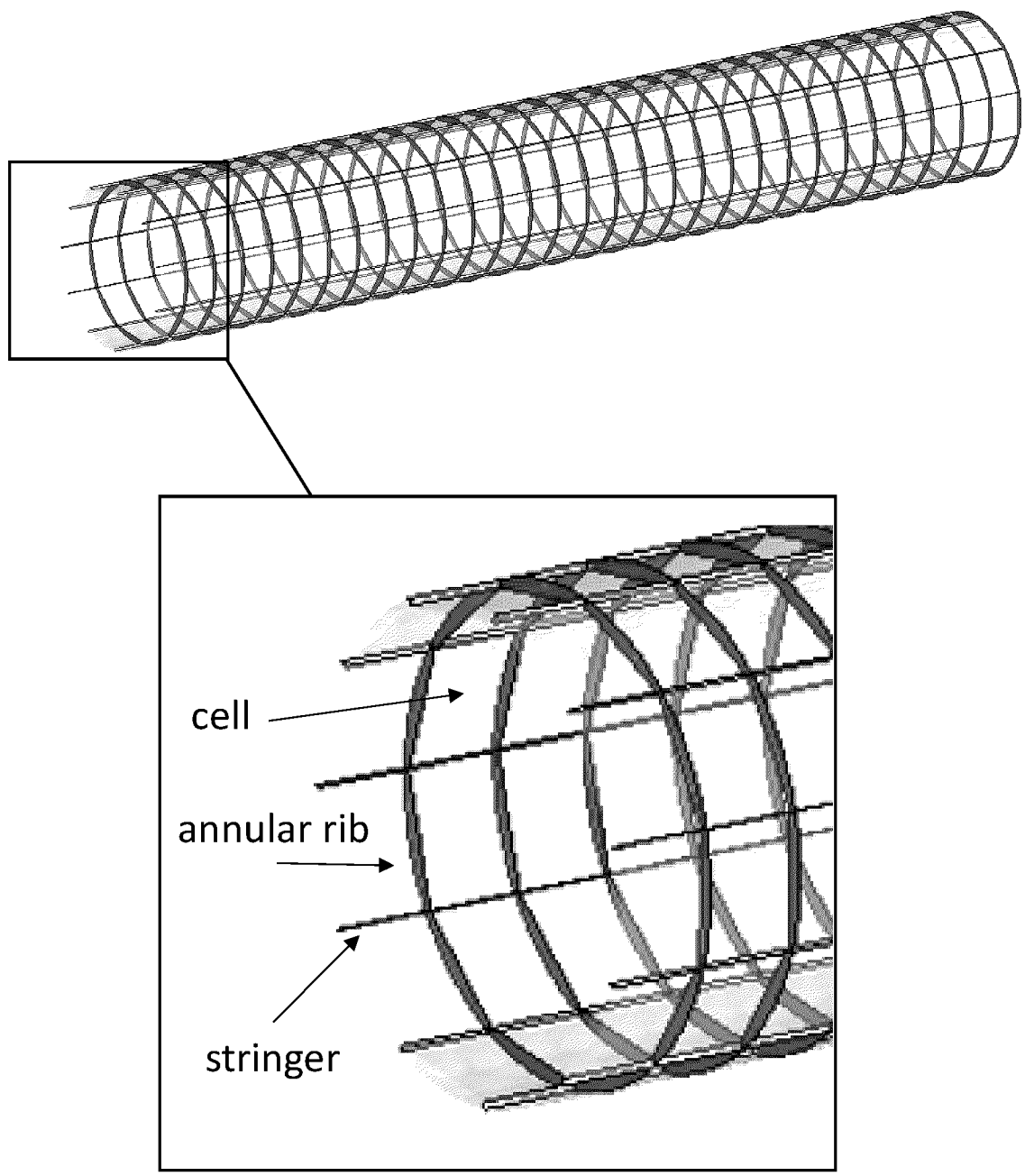
FIG. 5 shows the internal structure formed by the annular ribs and the stringers.

FIG. 5 shows the internal structure formed by the annular ribs (i.e. the circumferentially aligned edges 4e of the interlayer shell parts) and the stringers (i.e. the aligned flanges 3d on the eosp's). The cell size (the rectangular space between the annular ribs and the longitudinal ribs (stringers)) is visible, particularly in the enlarged section. The distance between the ribs is determined by the size of the flat portion (4a) of the interlayer shell parts (4) and can be varied by using differently sized interlayer shell parts (4) and by varying the orientation of the interlayer shell parts (4).

Figure 6:
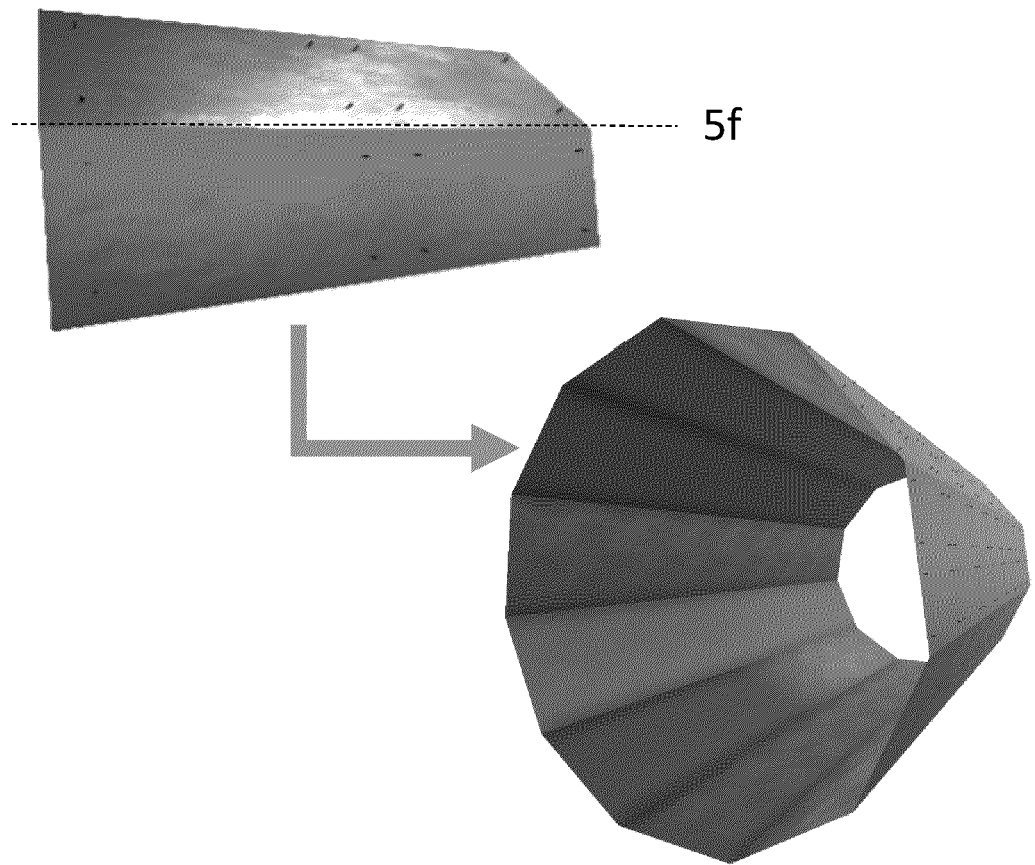
FIG. 6 shows a schematical drawing of the inner wall with the studs attached to the outside surface.

FIG. 6 shows a schematical drawing of the inner wall with the studs attached to the outside surface.

Figure 7:
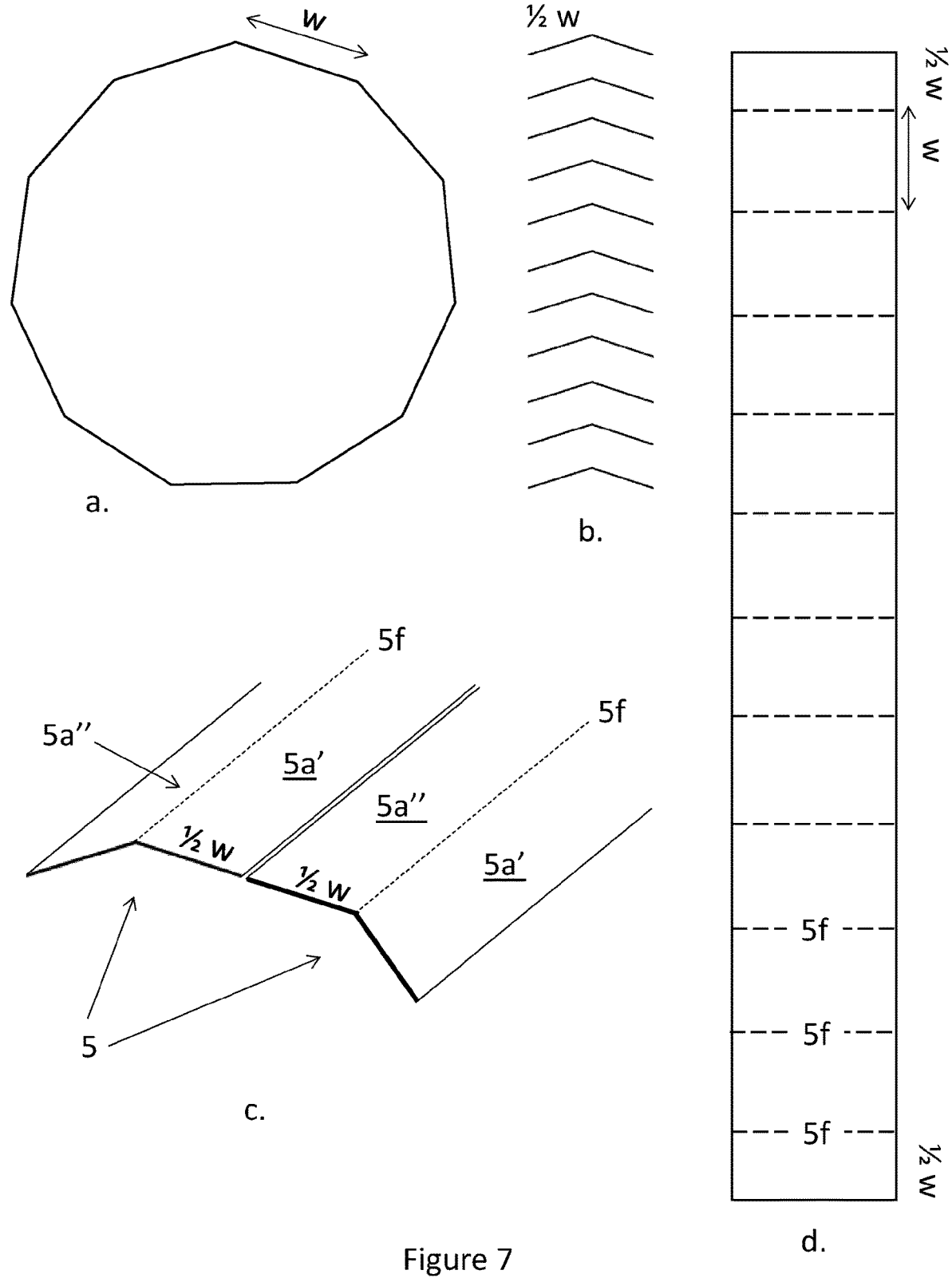
FIG. 7 parts a, b, c and d show two alternatives to produce the N-faceted inner wall of which the cross section.

FIG. 7 parts a, b, c, d show two alternatives to produce the N-faceted (in this case 11-faceted) inner wall of which the cross section is shown (a) as well as the width w of each facet. The inner wall can be produced by abutting 11 inner wall parts (5) which are provided with a kink 5f (the angle being 360/N, which in this example is 360/11=32.720) which is shown in FIG. 7 parts a, b, c. The second alternative of abutting is shown in FIG. 7 part c, where two parts are abutted along the long edges and wherein the flat faces 5a" of one part is flush with the flat face 5a' of the adjacent part so as to jointly form a face of the N-faceted ring. By abutting 11 parts thusly a complete ring of the IW is formed. The abutment is subsequently completely covered by the interlayer parts 4 (not shown here). An alternative is to produce a strip of a length of 11w (FIG. 7 part d) and the providing this strip with 11 kinks so as to divide the strip into 10 facets with a length w, and two facets at either end which together have a length w (in this example 2 times/2 w). The angle of the kinks (the dashed lines) is also 360/N and as a result of the kinking, the strip assumes the form of a N-faceted ring with only one seam.

FIG. 8 shows a schematical drawing of the interlayer shell part.

Figure 9:
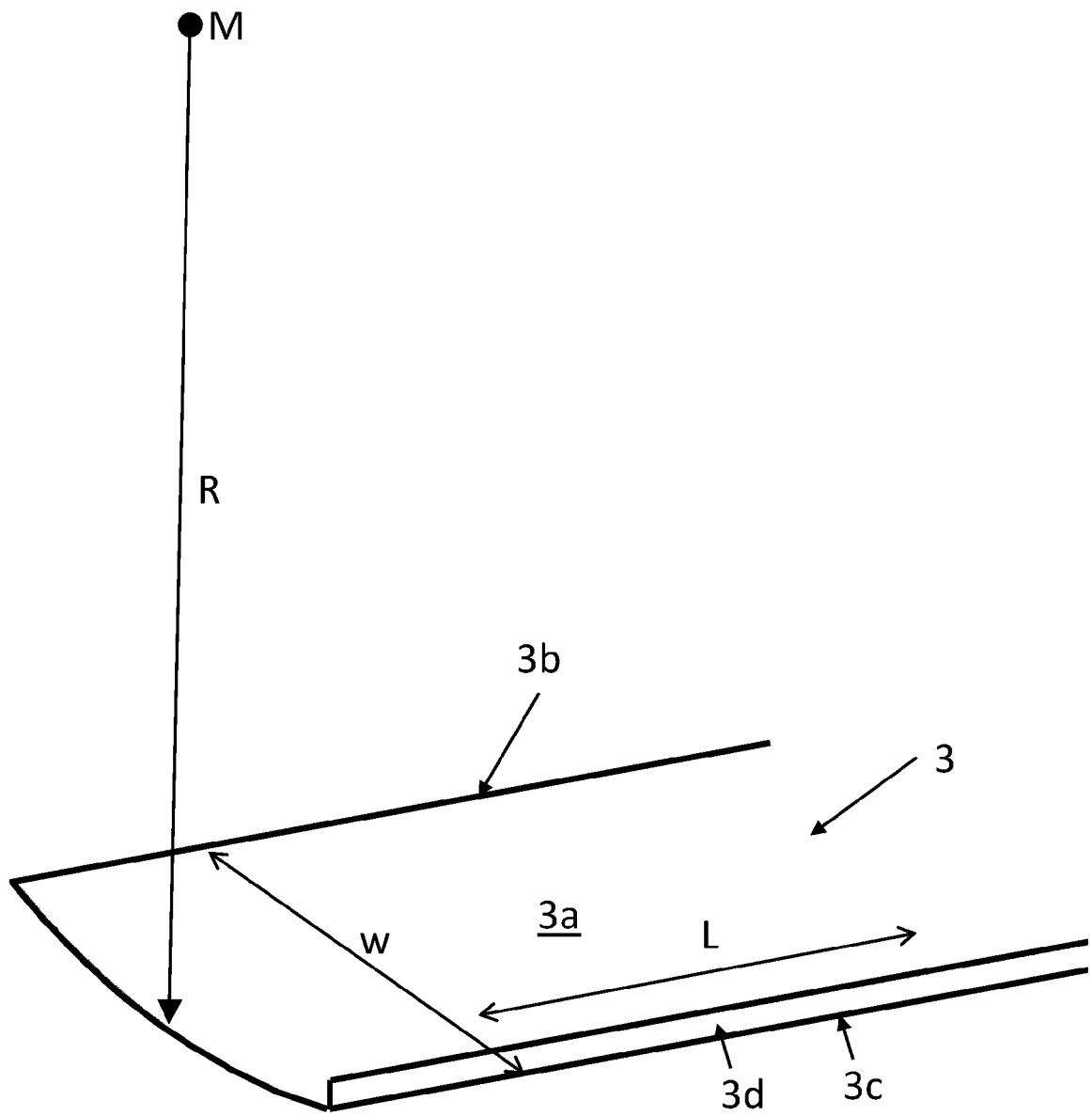
FIG. 9 shows a schematical drawing of the eosp.

FIG. 9 shows a schematical drawing of the eosp.

Figure 10:
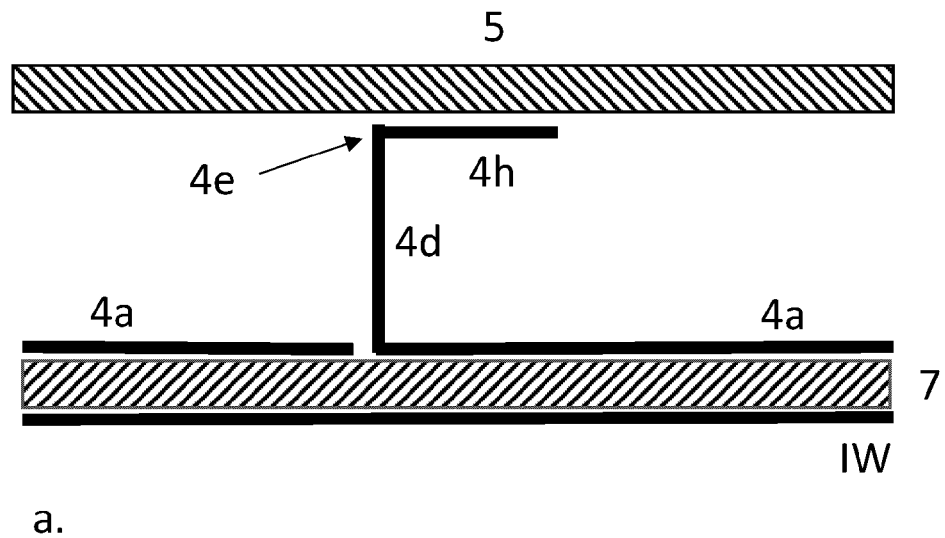
FIG. 10 shows a cross section of the abutting interlayer shell parts.
Figure 10:
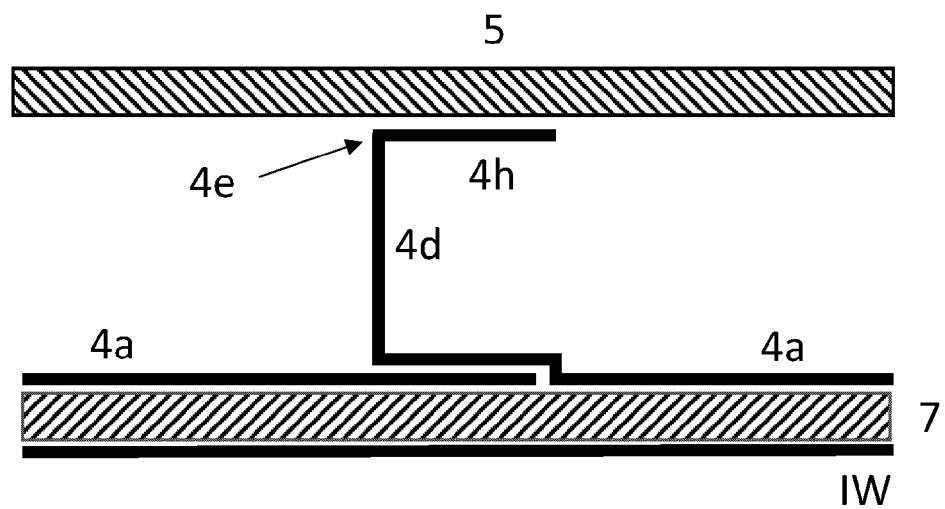

FIG. 10 shows a cross section of the abutting interlayer shell parts 4 where in FIG. 10a the flat central portion 4a abuts the flange 4d of the adjacent interlayer shell part, and where in FIG. 10b the flat central portion 4a lies under the flange 4d of the adjacent interlayer shell part.

The invention claimed is:

1. A double-walled tube segment suitable for underpressure applications or near vacuum applications comprising elongated curved outer shell parts, interlayer shell parts and an inner wall (IW), wherein the elongated curved outer shell parts form an outer wall (OW) of the double-walled tube segment and consist of a thin sheet, wherein the elongated curved outer shell part comprises long edges, a curved central portion and a flange along one of the long edges wherein the flange is folded towards the interior of the double-walled tube segment and wherein a centre of a radius of curvature R of the curved central portion of the elongated curved outer shell parts lies inside the double-walled tube segment;

wherein the interlayer shell parts consist of a thin sheet and comprise a rectangular portion having short edges and long edges and a flange on at least one of the short edges, wherein the flange is folded towards the exterior of the double-walled tube segment, wherein the flange has a curved upper edge with a radius of curvature equal to the radius of curvature R of the curved central portion of the elongated curved outer shell parts, and wherein the curved upper edge is provided with an additional flange with a radius of curvature equal to the radius of curvature R of the curved central portion of the elongated curved outer shell parts;

wherein the inner wall (IW) of the double-walled tube segment is a regular N-facetted polygonal tube consisting of a thin sheet;

wherein the rectangular portions of the interlayer shell parts are fixedly connected to the facets of the outside of the inner wall (IW);

wherein an inner surface of the curved central portion of the elongated curved outer shell parts are joined to the interlayer shell parts at least at the additional flange of the interlayer shell part to form the outer wall (OW).

2. The double-walled tube segment as claimed in claim 1, wherein an airtight foil, airtight shrink wrapping or airtight adhesive tape is provided between the inner wall (IW) and the interlayer shell parts.

3. The double-walled tube segment as claimed in claim 1, wherein the flanges of the interlayer shell parts are circumferentially aligned so as to form a plurality of continuous annular ribs around the internal wall (IW) of the double-walled tube segment, and wherein the flanges of the elongated curved outer shell parts are longitudinally aligned to as to form a plurality of longitudinal rims.

4. The double-walled tube segment as claimed in claim 1, wherein the curved central portion of the elongated curved outer shell part is connected to the additional flange of the interlayer shell part by releasable connecting means, and wherein the elongated curved outer shell part is connected to the rectangular portion by releasable connecting means.

5. The double-walled tube segment as claimed in claim 1, wherein a first said short edge of the rectanqular portion of the interlayer shell parts overlaps a second said short edge of the rectangular portion of a longitudinally adjoining said interlayer shell part.

6. The double-walled tube segment as claimed in claim 1, wherein circumferentially adjacent elongated curved outer shell parts are connected by releasable connecting means.

7. The double-walled tube segment as claimed in claim 1, wherein circumferentially adjacent elongated curved outer shell parts are welded together along the long edges of the curved portions.

8. The double-walled tube segment as claimed in claim 1, wherein an inner circumference of the inner wall (IW) is at least 3 m in diameter.

9. A tube for an evacuated tube transport system (ETT) comprising a plurality of double-walled tube segment as claimed in claim 1.

10. A method to produce a double-walled tube segment for constructing a double-walled tube segment of claim 1 suitable for underpressure applications or near vacuum applications comprising elongated curved outer shell parts, interlayer shell parts and an inner wall (IW), wherein
the elongated curved outer shell parts form an outer wall (OW) of the double-walled tube segment and consist of a thin sheet, wherein the elongated curved outer shell part comprises long edges, a curved central portion and a flange along one of the long edges wherein the flange is folded towards the interior of the double-walled tube segment and wherein a centre of a radius of curvature R of the curved central portion of the elongated curved outer shell parts lies inside the double-walled tube segment, wherein the interlayer shell parts consist of a thin sheet and comprise a rectangular portion having short edges and long edges and a flange on at least one of the short edges, wherein the flange is folded towards the exterior of the double-walled tube segment, wherein the flange has a curved upper edge with a radius of curvature equal to the radius of curvature R of the curved central portion of the elongated curved outer shell parts, and wherein the curved upper edge is provided with an additional flange with a radius of curvature equal to the radius of curvature R of the curved central portion of the elongated curved outer shell parts, and wherein the inner wall (IW) of the double-walled tube segment is a regular N-facetted polygonal tube consisting of a thin sheet, wherein the rectanqular portions of the interlayer shell parts are fixedly connected to the facets of the outside of the inner wall (IW);

wherein an inner surface of the curved central portion of the elongated curved outer shell parts are joined to the interlayer shell parts at least at the additional flange of the interlayer shell part to form the outer wall (OW);

wherein the method comprises the following steps:

Providing an internal support jig for temporarily supporting and holding the inner wall (IW);

Joining a plurality of the interlayer shell parts onto the facets of the polygonal outer surface of the tube segment to cover the facets of the polygonal outer surface of the tube whereby the flanges of all interlayer shell parts are circumferentially aligned so as to form complete annular ribs around the internal wall of the tube segment;

Forming the outer surface of the tube segment by joining the curved central portion of the elongated curved outer shell parts to the additional flanges of the interlayer shell parts;

Removing the internal support jig.

11. The method according to claim 10, wherein an airtight foil, an airtight shrink wrapping or an airtight adhesive tape is provided around the outer perimeter of the inner wall temporarily held by the support jig to form a polygonal outer surface of the tube segment.

12. The method as claimed in claim 10, wherein the inner wall (IW) is constructed from thin sheet inner shell parts wherein the inner shell parts are provided in the form of a plurality of N-faceted polygonal rings.

13. The method as claimed in claim 10, wherein the N-faceted polygonal rings are welded together along their circumference to form the inner wall (IW) for the double-walled tube segment.

14. The method as claimed in claim 10, wherein the inner wall (IW) is constructed from inner shell parts consisting of a kinked rectangular thin sheet having kinks wherein the kinks substantially runs parallel to the longitudinal edge of the inner shell part, thereby providing the thin sheet with two flat portions separated by the kink, and wherein the inner wall (IW) is formed by abutting the inner shell parts longitudinally by aligning the kinks and circumferentially by abutting the longitudinal edges in such a way that the abutting flat portions of the circumferentially abutting N inner shell parts are in the same plane to collectively form the N-faceted regular polygonal inner wall.

15. The method as claimed in claim 10, wherein the inner wall and the inter layer shell parts are connected by means of threaded studs fixedly provided on the inner wall (IW), joints provided with threading on both sides to connect with the threaded studs of the inner wall (IW) on one side and threaded bolts on the other side,
- wherein the interlayer shell parts are provided with holes corresponding with the locations of the studs, wherein the joints are threaded onto the studs and firmly join the inner wall (IW) to the interlayer shell parts, optionally with the foil, wrapping or tape in between,
- wherein the joints also serve as distance holders between the interlayer shell parts and the elongated curved outer shell parts, and
- wherein the elongated curved outer shell parts are also provided with holes corresponding with the location of the joints and wherein the elongated curved outer shell parts are connected to the joints by the threaded bolts.

16. The method as claimed in claim 11, wherein the inner wall and the inter layer shell parts are connected by means of threaded studs fixedly provided on the inner wall (IW), joints provided with threading on both sides to connect with the threaded studs of the IW on one side and threaded bolts on the other side,
- wherein the interlayer shell parts are provided with holes corresponding with the locations of the studs, wherein the studs penetrate the airtight foil, shrink wrapping or adhesive tape during its application, and wherein the joints are threaded onto the studs and firmly join the inner wall (IW) to the interlayer shell parts, optionally with the foil, wrapping or tape in between,
- wherein the joints also serve as distance holders between the interlayer shell parts and the elongated curved outer shell parts, and wherein the elongated curved outer shell parts are also provided with holes corresponding with the location of the joints and wherein the elongated curved outer shell parts are connected to the joints by the threaded bolts.

17. The method as claimed in claim 10, wherein the curved portion of the elongated curved outer shell part is connected to the additional flange by means of internally threaded three-piece rivets.

\* \* \* \* \*